United States Patent
Bommareddy et al.

(10) Patent No.: US 6,779,039 B1
(45) Date of Patent: Aug. 17, 2004

(54) SYSTEM AND METHOD FOR ROUTING MESSAGE TRAFFIC USING A CLUSTER OF ROUTERS SHARING A SINGLE LOGICAL IP ADDRESS DISTINCT FROM UNIQUE IP ADDRESSES OF THE ROUTERS

(75) Inventors: Satish Bommareddy, San Jose, CA (US); Makarand Kale, Sunnyvale, CA (US); Srinivas Chaganty, San Jose, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/540,296

(22) Filed: Mar. 31, 2000

(51) Int. Cl.[7] .............................................. G06F 15/173
(52) U.S. Cl. ........................ 709/238; 709/226; 709/245
(58) Field of Search ................................ 370/389, 401, 370/409; 709/200, 238, 105, 225–226, 229, 245

(56) References Cited

U.S. PATENT DOCUMENTS

| | | |
|---|---|---|
| 5,283,897 A | 2/1994 | Georgiadis et al. |
| 5,301,226 A | 4/1994 | Olson et al. |
| 5,473,599 A | 12/1995 | Li et al. |
| 5,513,314 A | 4/1996 | Kandasamy et al. |
| 5,583,940 A | 12/1996 | Vidrascu et al. |
| 5,586,121 A | 12/1996 | Moura et al. |
| 5,608,447 A | 3/1997 | Farry et al. |
| 5,612,865 A | 3/1997 | Dasgupta |
| 5,612,897 A | 3/1997 | Rege |
| 5,634,125 A | 5/1997 | Li |
| 5,652,892 A | 7/1997 | Ugajin |
| 5,655,140 A | 8/1997 | Haddock |
| 5,666,487 A | 9/1997 | Goodman et al. |

(List continued on next page.)

FOREIGN PATENT DOCUMENTS

| | | |
|---|---|---|
| JP | 4093211789 | 12/1997 |
| WO | WO 99/32956 | 7/1999 |

OTHER PUBLICATIONS

Internet—"Quasi–Dynamic Load–Balancing (QDLB) Methods." Apr. 25, 1995, pp. 2 and 5.
IBM, Document Identifier: NN9305363 "Value–Oriented Approach to Selecting *Buckets* for Dat Redistribution," West, May 1, 1993.
Internet—Becker, Wolfgang, "Dynamic Load Balancing for Parallel Database Processing," Institute of Parallel and Distributed High–Performance Systems (IPVR), University of Stuttgart Breitwiesenstr, Stuttgart, Germany, 1997.
Omiecinski, Edward, "Performance Analysis of a Load Balancing Hash–Join Algorithm for a Shared Memory Multiprocessor," The ACM Sigmod Anthology, 17th International Conference of Very Large Data Bases, Sep. 3, 1991.

*Primary Examiner*—Hosain Alam
*Assistant Examiner*—Philip B. Tran
(74) *Attorney, Agent, or Firm*—David Volejnicek

(57) ABSTRACT

A router clustering system connects two or more routers to a one or more distinct Internet Service Providers (ISPs) in a complete high-availability arrangement. Typically the two or more routers connect to a plurality of ISPs at a site so that an outage of one ISP does not affect connectivity and availability to the site. The router clustering system typically includes a plurality of clustering units for redundancy that avoids difficulties that arise with a single point of failure. For example two clustering units may be used in an active-passive high-availability configuration. A router cluster creator creates or configures a router cluster. To create a router cluster, an administrator assigns to the cluster a logical Internet protocol (IP) address IPgw and specifies routers that are members of the cluster.

45 Claims, 6 Drawing Sheets

Microfiche Appendix Included
(2 Microfiche, 122 Pages)

U.S. PATENT DOCUMENTS

| | | |
|---|---|---|
| 5,687,369 A | 11/1997 | Li |
| 5,740,375 A | 4/1998 | Dunne et al. |
| 5,754,752 A | 5/1998 | Sheh et al. |
| 5,764,895 A | 6/1998 | Chung |
| 5,774,660 A | 6/1998 | Brendel et al. |
| 5,774,668 A | 6/1998 | Choquier et al. |
| 5,796,941 A | 8/1998 | Lita |
| 5,805,804 A | 9/1998 | Laursen et al. |
| 5,812,819 A | 9/1998 | Rodwin et al. |
| 5,815,668 A | 9/1998 | Hashimoto |
| 5,828,833 A | 10/1998 | Belville et al. |
| 5,835,696 A | 11/1998 | Hess |
| 5,835,710 A | 11/1998 | Nagami et al. |
| 5,862,338 A | 1/1999 | Walker et al. |
| 5,864,666 A | 1/1999 | Shrader |
| 5,898,830 A | 4/1999 | Wesinger, Jr. et al. |
| 5,920,699 A | 7/1999 | Bare |
| 5,936,936 A | 8/1999 | Alexander, Jr. et al. |
| 5,949,753 A | 9/1999 | Alexander, Jr. et al. |
| 5,951,634 A | 9/1999 | Sitbon et al. |
| 5,959,990 A | 9/1999 | Frantz et al. |
| 5,963,540 A * | 10/1999 | Bhaskaran ................. 370/218 |
| 5,999,536 A | 12/1999 | Kawafuji et al. |
| 6,006,259 A | 12/1999 | Adelman et al. |
| 6,006,264 A | 12/1999 | Colby et al. |
| 6,047,319 A | 4/2000 | Olson |
| 6,078,957 A * | 6/2000 | Adelman et al. ........... 709/224 |
| 6,097,882 A | 8/2000 | Mogul |
| 6,098,093 A | 8/2000 | Bayeh et al. |
| 6,101,616 A | 8/2000 | Joubert et al. |
| 6,108,300 A | 8/2000 | Coile et al. |
| 6,141,755 A | 10/2000 | Dowd et al. |
| 6,226,684 B1 * | 5/2001 | Sung et al. .................. 709/238 |
| 6,266,335 B1 * | 7/2001 | Bhaskaran ................. 370/399 |
| 6,295,276 B1 * | 9/2001 | Datta et al. ................. 370/218 |
| 6,356,985 B1 * | 3/2002 | Ichimi et al. ............... 711/154 |
| 6,389,448 B1 * | 5/2002 | Primak et al. ............. 709/105 |
| 6,397,260 B1 * | 5/2002 | Wils et al. .................. 709/238 |
| 6,484,261 B1 | 11/2002 | Wiegel |
| 6,530,032 B1 | 3/2003 | Shew et al. |
| 6,606,708 B1 | 8/2003 | Devine et al. |
| 6,647,400 B1 | 11/2003 | Moran |

\* cited by examiner

SYSTEM AND METHOD FOR ROUTING MESSAGE TRAFFIC USING A CLUSTER OF ROUTERS SHARING A SINGLE LOGICAL IP ADDRESS DISTINCT FROM UNIQUE IP ADDRESSES OF THE ROUTERS

CROSS REFERENCE TO RELATED APPLICATIONS

Application Ser. No. 08/994,709, now U.S. Pat. No. 6,266,355, entitled "Cross-Platform Server Clustering Using A Network Flow Switch," discloses and claims flow switch features used in the system of this invention. U.S. Pat. No. 5,963,540 entitled "Router Pooling in a Network Flow Switch," discloses and claims router fault tolerance and router load balancing features used in the system of this invention. Co-pending application Ser. No. 08/992,038, now Pat. No. 6,601,084, entitled "Dynamic Load Balancer for Multiple Network Servers," discloses and claims load balancing used in the system of this invention. Co-pending application Ser. No. 09/540,238 entitled "Firewall Pooling in a Network Flowswitch," discloses and claims pooling used in the system of this invention. Co-pending application Ser. No. 09/540,297 entitled "Firewall Clustering for Multiple Network Servers." All cited applications are incorporated herein by reference in their entirety.

CROSS REFERENCE TO APPENDIX

This patent application includes microfiche Appendix A which is a part of the present disclosure and which is incorporated by reference herein in its entirety. This Appendix consists of a total of 2 sheets that contain a total of 122 frames. Appendix A is a listing of software code for embodiments of the present invention, which are described more completely below.

BACKGROUND OF THE INVENTION

1. Field of the Invention

The present invention relates generally to computer networking and, in particular, to a system that performs clustering of routers in multiple network servers.

2. Discussion of Related Art

Increasing numbers of companies are conducting transactions and building relationships online, with consumers and business partners in a phenomenon called "e-business."

E-business is usage of Internet-based technologies to improve communications with customers and information exchange with business partners, and to increase sales. Web sites, electronic commerce, intranets, and extranets are all examples of E-business entities. Many Web, DNS, proxy, FTP, firewall, and application server services are needed in any of these environments. If any of the services fails or responds slowly, the entire system suffers. Downtime in today's highly competitive marketplace can mean lost revenue and lost credibility.

Adding more memory or substituting a larger server can expand the capacity of an E-business entity, such as a Website. In either case, expansion requires downtime and an additional capital expenditure. In conventional systems, the only way to supply a reliable capacity to meet a rapidly increasing demand is to purchase computing power far beyond that which meets current needs. Then, once the demand exceeds the purchased computing power, the entire computer must be replaced and the purchase cycle repeated. The conventional business practice is highly inefficient, wasteful of operating expenses, and inadequate for meeting customer needs.

One technique for improving the reliability and responsiveness of Internet sites is the usage of server clusters. Server clusters are arrays of servers that share common tasks while appearing to external devices as single resources. In a cluster, each server shares the load that would be handled traditionally by a large server alone. A user accesses a cluster in the same manner as a single server is accessed.

Clusters improve both reliability and scalability of operation in comparison to single server operation. Redundant servers in a cluster support tolerance to system failures.

Several basic approaches to Internet server clustering and load balancing are presently available. One approach is the usage of software executing on one or more servers to create clusters of Internet Servers. The clusters are peer-to-peer clusters with no arbitrator or manager. According to measurements using benchmarking tools, software-based cluster performance is generally poor since servers in the cluster must devote significant amounts of computer power to managing the cluster. Also, communications among the servers for cluster management and resource arbitration add large amounts of data onto the network connecting the servers.

A second approach is the usage of "load balancing" software executing on special-purpose industrial PCs. A PC executing the load balancing software broadcasts the source PC Internet Protocol (IP) address as an identification address of the cluster of Internet Servers. As network traffic is received, the load balancing system uses a technology known as Network Address Translation (NAT) to modify each packet, changing from the source IP address to the actual address of the server that is to receive the traffic. The server responds to the request and the PC load balancing software again uses NAT to modify the "From" address in each packet to create the appearance that the PC load balancer sent the packets. PC load balancers are restricted to applications that use TCP/IP (transmission control protocol/Internet protocol), effectively limiting the applications to technologies including Web servers, firewall servers and proxy servers. The TCP/IP products usually become a bottleneck for data traffic into and out of the cluster, slowing overall performance. NAT technology requires that the body of each packet be available to the processor, so a cluster based on a PC load balancer cannot be used if the data packets are encrypted.

A third approach is the usage of load balancing software that executes from a local area network (LAN) switch rather than a PC. Execution from the switch hardware increases data transfer rates but remains based on NAT technology using TCP/IP, limiting applications to Web servers, firewall servers, and proxy servers. Switch-based and PC load balancers cannot be used when the data packets are encrypted.

What is needed is a system and operating method that attains very high data throughput rates and supports all Internet protocols.

SUMMARY OF THE PRESENT INVENTION

A router clustering system connects two or more routers to one or more distinct Internet Service Providers (ISPs) in a high-availability arrangement. Typically, the two or more routers connect to a plurality of ISPs at a site so that an outage of one ISP does not affect connectivity and availability to the site. The router clustering system typically includes a plurality of clustering units for redundancy that avoids difficulties that arise with a single point of failure. Fore example, two clustering units may be used in an active-passive high-availability configuration.

Various implementations of the router clustering system have several router clustering features and benefits. Outgoing traffic that is destined for devices on the Internet is distributed among the two or more routers included in the cluster. The router clustering system distributes traffic based on the destination IP addresses of the packets thus ensuring that all IP-based protocols are supported.

In some embodiments, the same router handles all outgoing traffic for a single client-server session, and unlimited client-server sessions can be supported.

In some embodiments, the same router handles all outgoing traffic for a single client-server session and unlimited client-server sessions can be supported.

For communication interconnects using a router clustering system, servers need not be configured with multiple gateways. Servers are configured to use a single 'logical' gateway having an IP address identifying the router cluster.

In some implementations, the router clustering system continually monitors the operational health of the routers and associated wide area network (WAN) links.

In some implementations, the router clustering system detects one or more of various failure conditions including: (1) failure of the router LAN interface and link, (2) failure of the router due to power outage, software malfunction, hardware malfunction, or other condition, and (3) failure of the router WAN interface and link. When the router clustering system detects a failure, traffic is automatically forwarded to the remaining operational router or routers. The router clustering system does not require manual intervention at the server to bypass the failed router.

Additional routers may be seamlessly added to supply additional bandwidth and greater fault tolerance.

The router clustering system operates in a manner that is independent of the router hardware and software. Various combinations of routers can exist in the cluster as long as the routers have the same connectivity.

In one aspect of a router clustering system, a router cluster creator creates or configures a router cluster. To create a router cluster, an administrator assigns to the cluster a logical Internet protocol (IP) address IPgw and specifies routers, Router1 and Router2, that are members of the cluster. Typically the member routers are previously configured as servers. The router clustering system begins to monitor "health" of the routers. In some implementations, the router clustering system monitors router health using a configured polling interval and health check method.

In some implementations, a logical router cluster address IPgw is configured on the servers as a 'default' gateway rather than a unique IP address of one of the routers.

The router clustering system responds to an Address Resolution Protocol (ARP) request from the servers to identify a Media Access Control (MAC) address associated with the router cluster. Associating the MAC address with the router cluster ensures that the servers send all outbound traffic to the router clustering system for forwarding on to the designated final destination on the Internet.

In another aspect of the router clustering system, a traffic distributor distributes outbound traffic destined for the Internet among the routers. The traffic distributor of the router clustering system determines which router is to forward the outbound traffic based on the packet destination IP address. Usage of the destination IP address ensures that, for a given flow designating a server-destination connection, the same router is used for every outbound packet so long as the router remains operational. Internally, the traffic distributor maintains a list of operational routers. Fields from the packet are used to compute the index into this list, identifying the active router.

For other types of clusters that are supported, the traffic distributor only modifies the destination MAC address of the redirected traffic. The traffic distributor is a software process that executes on hardware devices such as a LAN switch. A hardware device has a particular MAC address that identifies the traffic distributor. The traffic distributor replaces the packet destination MAC address, which previous to replacement is the MAC address of the traffic distributor, with the MAC address of the router handling the flow.

Each router has an equal probability of assignment for an outbound flow forwarding since the traffic distributor uses only information in the packet IP header to select between routers. Processing load or potential processing power of the router is not analyzed in the selection.

The router cluster does not affect the processing performed by the router clustering system for inbound traffic coming from the Internet. Traffic destined for any of the server clusters continues to be distributed among the operational servers defined in the server clusters. Multiple firewall or router clusters are supported for inbound traffic (e.g. by use of multiple MAC addresses).

A clustering system operates on all types of Internet protocol (all/IP) technologies and can be used to create a cluster of any Internet Servers, no matter what protocol is running on IP, even Voice over Internet protocol (Volp) and streaming audio/video via User Datagram Protocol (UDP/IP).

The clustering system avoids problems associated with NAT such as an inability to encrypt the data, because the all/IP approach allows each of the servers in the cluster to use the same IP address as the cluster's overall address.

In some embodiments, the clustering system executes on local area network (LAN) switch hardware to attain very high data throughput rates.

Unlike Switch-based load balancers, a clustering system does not process packets flowing from servers to users, the direction of the largest data flow. Instead, the router clustering system operates as a wire-speed switch for downstream traffic.

Advantages of a clustering system depend on the particular implementation of the system. One advantage is that capacity of the cluster increases linearly as additional servers are added to the cluster. In various implementations, the clustering system manages all or some of the cluster activities, freeing servers in the cluster from expending computing power on cluster management.

The clustering system controls connections of clients to particular servers, reducing the computing required to manage the cluster on servers in the cluster and freeing computing power to be applied to the task of the cluster.

The clustering system can manage many different clusters simultaneously, allowing specific hardware to easily migrate from one cluster to another, as demand patterns dictate.

Management of a clustering system and one or more clusters is accomplished through any of several different management methods, including telnet, CLI, Web browser, and SNMP. The clustering system assists customers with an easy-to-use single point of management to control multiple clusters in multiple tiers of computing. The clustering system allows administrators to choose the management method that works best for the particular business characteristics and facility.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION

Figure 1:
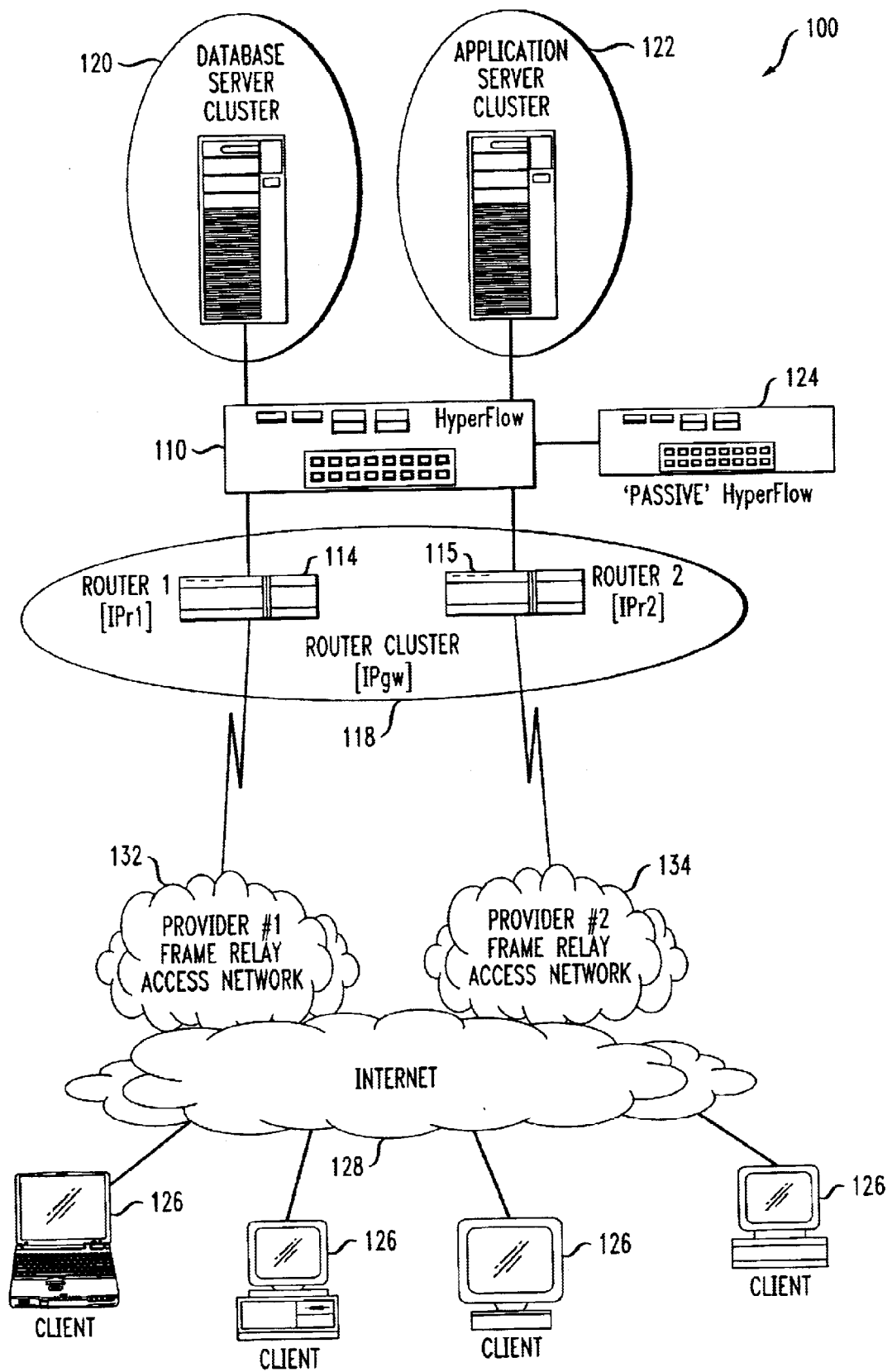
FIG. 1 is a schematic block diagram that illustrates an embodiment of a router clustering system connecting two or more routers to a one or more distinct Internet Service Providers (ISPs).

Referring to FIG. 1, a schematic block diagram illustrates an embodiment of a router clustering system 100 that connects two or more routers, for example Router1 114 and Router 2 115, to one or more distinct Internet Service Providers (ISPs) in an arrangement with complete high-availability, scalability, and traffic distribution. In the illustrative router clustering system 100, a network flow controller 110 includes a processor (not shown) and storage (not shown) that execute special-purpose software and control the network flow controller 110. The network flow controller 110 arranges the two or more routers, Router1 114 and Router2 115, in a router cluster 118 to connect to a plurality of ISP's. The network flow controller 110 arranges the ISPs in one or more server clusters so that an outage of one ISP does not affect connectivity and availability to a server cluster. In the illustrative system, the network flow controller 110 arranges the ISPs into two clusters, a Database Server Cluster 120 and an Application Server Cluster 122.

The router clustering system 100 includes a plurality of clustering units, illustratively the network flow controller 110 which operates as an active flow controller and a passive flow controller 124, for redundancy that avoids difficulties that arise with a single point of failure. The network flow controller 110 and the passive flow controller 124 are used in an active-passive high-availability configuration.

Outgoing traffic from the Database Server Cluster 120 and the Application Server Cluster 122 that is destined for client devices 126 on the Internet 128 is distributed among the two or more routers, Router1 114 and Router2 115. The router clustering system 100 distributes traffic based on the destination IP addresses of the packets, thus supporting all IP-based protocols.

Routers in the router cluster 118 are configured to be "route equivalent", supplying connectivity to the same destinations. Devices such as the servers or the network flow controller 110, not the routers, maintain client-server state information. An application running on the servers in the Database Server Cluster 120 or Application Server Cluster 122 is able to handle traffic distributed over multiple routers in the router cluster 118. Since the data is distributed over a plurality of routers, packets potentially arrive at a destination client out-of-sequence.

The network flow controller 110 and passive flow controller 124 arrange the servers in clusters that can be configured with one or multiple physical gateways although the network flow controller 110 configures the servers to use a single 'logical' gateway having an IP address identifying the router cluster 118. In some implementations, the network flow controller 110 and the passive flow controller 124 may be incorporated with a local area network (LAN) switch.

Additional routers may be seamlessly added to supply additional bandwidth and greater fault tolerance.

The network flow controller 110 operates independently of the hardware and software that are arranged in the clusters. For example, various combinations of routers can exist in the cluster as long as the routers have the same connectivity.

The router clustering system 100 includes multiple control processes that execute on the network flow controller 110 and the passive flow controller 124. One control process is a router cluster creator that creates or configures the router cluster 118.

Figure 2:
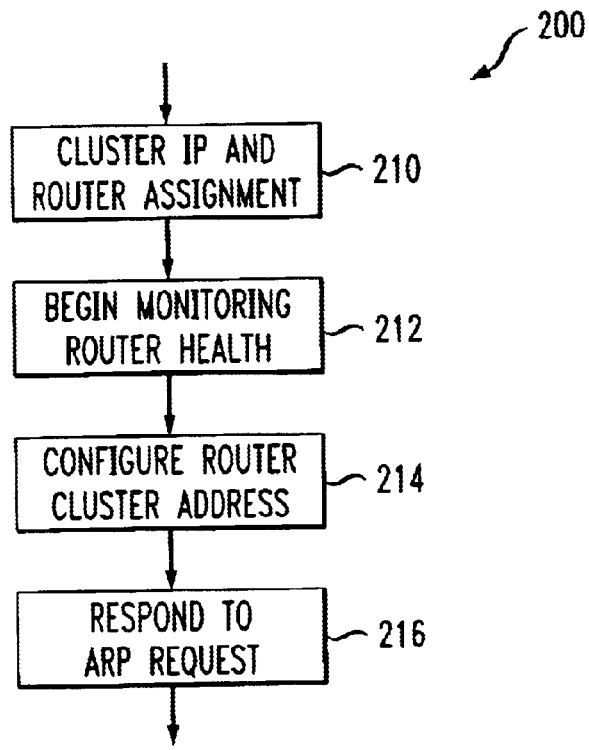
FIG. 2 is a schematic flow chart that depicts operations of a router cluster creator.

Referring to FIG. 2 in conjunction with FIG. 1, a schematic flow chart depicts operations of a router cluster creator 200. To create the router cluster 118, in a cluster IP and router assignment operation 210 an administrator assigns to the cluster a logical Internet protocol (IP) address IPgw and specifies routers, Router1 114 and Router2 115, that are members of the router cluster 118. In a begin monitoring router health operation 212, the network flow controller 110 begins to monitor health of the routers, Router1 114 and Router2 115, typically using a health check operation at a configured polling interval. In a configure router cluster address operation 214, the logical router cluster address IPgw is configured on the servers. In some implementations, the logical router cluster address IPgw is configured on the servers as a 'default' gateway rather than a unique IP address of one of the routers.

In a respond to ARP request operation 216, the network flow controller 110 responds to an Address Resolution Protocol (ARP) request from the servers in the Database Server Cluster 120 and Application Server Cluster 122 to identify a Media Access Control (MAC) address associated with the router cluster 118. Associating the MAC address with the router cluster 118 ensures that the servers send all outbound traffic to the router cluster 118 for forwarding on to the designated final destination on the Internet 128. In the illustrative router clustering system 100, traffic is routed to the Internet 128 via Frame Relay Access Network providers 132 and 134.

Figure 3:
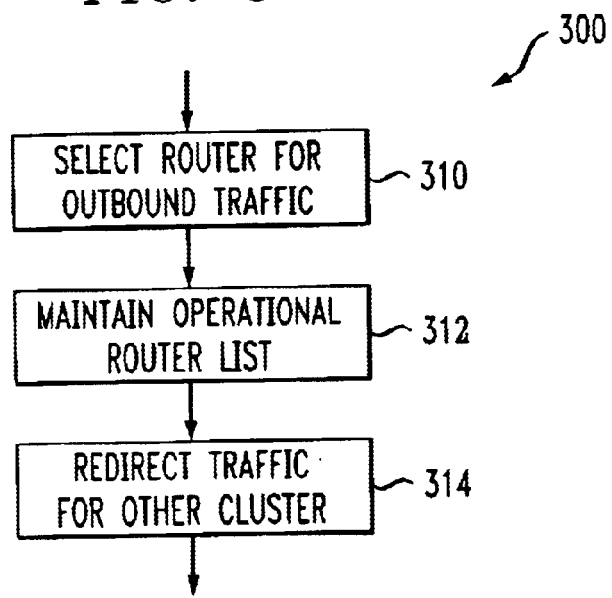
FIG. 3 is a schematic flow diagram showing operations of a traffic distributor.

Another control process is a traffic distributor that distributes outbound traffic destined for the Internet 128 among the routers, Router1 114 and Router2 115. Referring to FIG. 3 in combination with FIG. 1, a schematic flow diagram shows operations of a traffic distributor 300. The traffic distributor executes from the network flow controller 110. The traffic distributor 300, in a select router for outbound traffic operation 310, determines which router is to forward the outbound traffic based on the packet destination IP address. Usage of the destination IP address ensures that, for a given flow designating a server-destination connection, the same router is used for every outbound packet so long as the router remains operational. Since flow is based on the destination IP address, measurement and analysis operations by the network flow controller 110 are reduced since measurements of parameters such as load on the routers is not necessary. Accordingly, router load sharing is on a probabilistic or statistical basis, which may result is slightly unbalanced loading. The probabilistic loading presumes that routers in the router cluster 118 have similar forwarding power.

Internally, in a maintain operational router list operation 312 the traffic distributor 300 maintains a list of operational routers. Fields from the packet are used to compute the index into this list, identifying the active router.

For other types of clusters that are supported, the traffic distributor 300 only modifies the destination MAC address of the redirected traffic in a redirect traffic for other cluster operation 314.

The network flow controller 110 has a particular MAC address that identifies the traffic distributor. The traffic distributor replaces the packet destination MAC address, which previous to replacement is the MAC address of the traffic distributor, with the MAC address of the router handling the flow.

Each router, Router1 114 or Router2 115, has an equal probability of assignment for an outbound flow forwarding since the traffic distributor uses only information in the packet IP header to select between routers. Processing load or potential processing power of the router is not analyzed as part of the selection process.

The router cluster 118 does not affect the processing performed by the network flow controller 110 for inbound traffic coming from the Internet 128. Traffic destined for any router cluster 118 continues to be distributed among the operational servers defined in the router cluster 118. At most only a single router cluster 118 is supported for inbound traffic.

Another control process is a router monitor that monitors "health" of the routers. In some implementations, the router clustering system 100 monitors router health using a configured polling interval and health check method. The health probe authenticates connectivity of a flow across a router or firewall. In one example the network flow controller 110 periodically sends a Ping packet to router 114, using ICMP extension to confirm that the flow is operative. Router 114 responds on the same port. The Ping packet is sent for each of a plurality of ports.

In some implementations, the router clustering system 100 continually monitors the operational health of the routers and associated wide area network (WAN) links.

In some implementations, the router clustering system 100 detects one or more of various failure conditions. Failures can occur in the router LAN interface and link, or in the router due to power outage, software malfunction, hardware malfunction, or other condition. Failures also can occur in the router WAN interface and link. When the router clustering system 100 detects a failure, traffic is automatically forwarded to the remaining operational router or routers. The router clustering system does not require manual intervention at the server to bypass the failed router.

Figure 4:
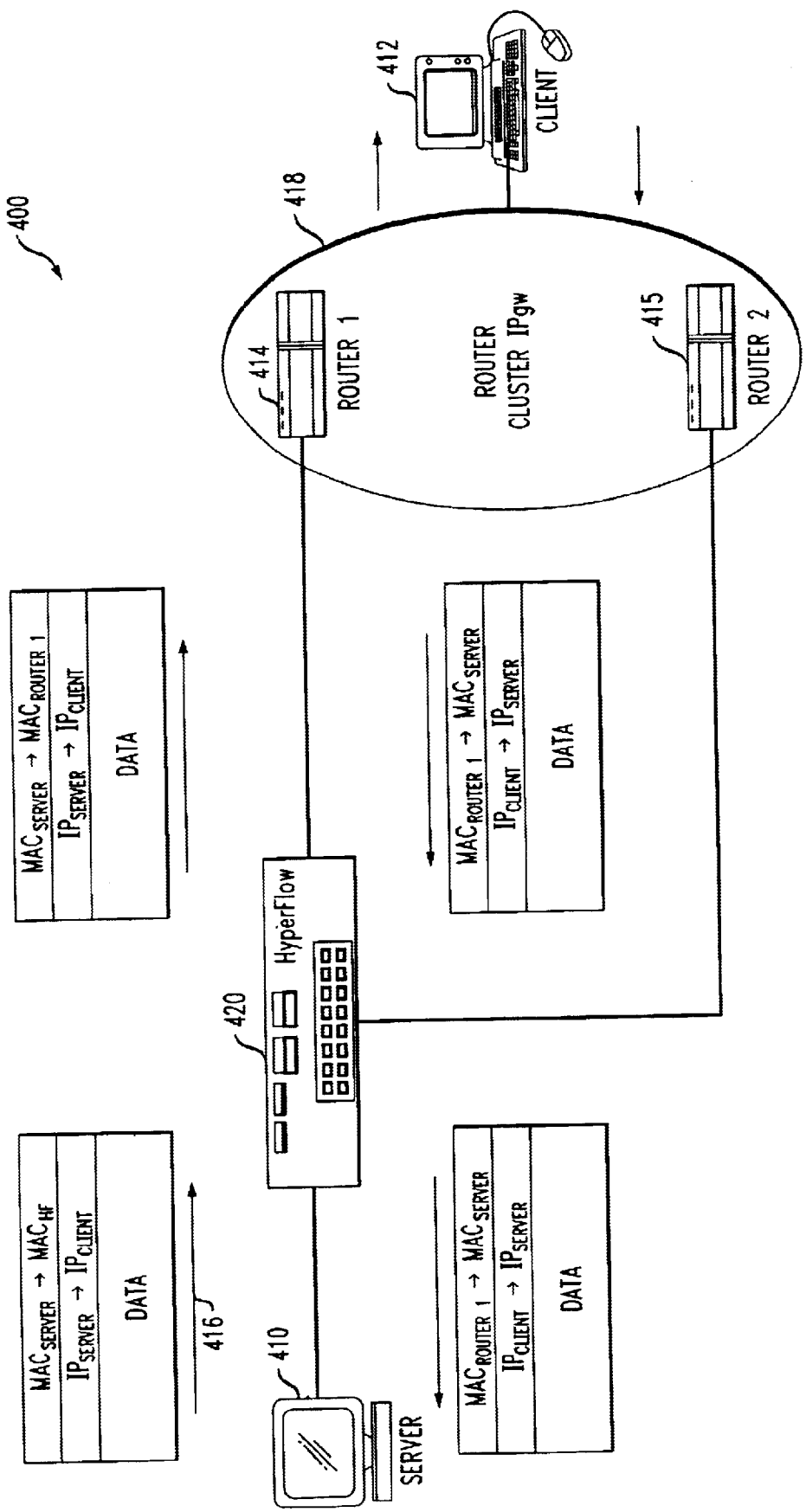
FIG. 4 is a schematic block diagram and associated transition tables that illustrate a technique for transferring a packet between a server and a client using a router clustering system.

Referring to FIG. 4, a schematic block diagram and associated transition tables depicts a technique for transferring a packet between a server 410 and a client 412 that is assigned to use Router1 414 by the router clustering system. The outbound traffic 416 has a destination MAC address designating the MAC address of the traffic distributor, but has a destination IP address that designates neither the traffic distributor nor any cluster supported by the traffic distributor. Router cluster traffic has no unique attribute other than destination IP address so that designation of the destination IP address effectively limits the current traffic distributor to support only a single router cluster 418. Although only a single router cluster 418 is included in the router clustering system 400, the router cluster 418 typically includes a plurality of routers, here shown as Router1 414 and Router2 415.

The limitation to a single router cluster 418 further extends to limit the router clustering system 400 to a single cluster that performs a routing function. Firewalls within a firewall cluster also have a routing function so that a system can support either a firewall cluster or a router cluster, but not both.

Other implementations of a router clustering system that supports multiple MAC addresses can support additional router clusters.

The IP address of the router cluster 418 does not appear in the packet since the router cluster 418 is only a gateway on the path to an actual end destination.

A network flow controller 420 uses ARP probe methods to monitor the routers in the router cluster 418. Software executing in the network flow controller 410 uses the Address Resolution Protocol (ARP) to probe for an unused IP address. If a router responds to the ARP probe, the software tries the next IP address. If, after several tries, no response is elicited from an ARP probe, software uses that address as the IP address of the router. In an illustrative embodiment, ARP probe methods are used, although the ICMP Router Discovery Protocol (IRDP) for detecting routers is not supported.

Figure 5:
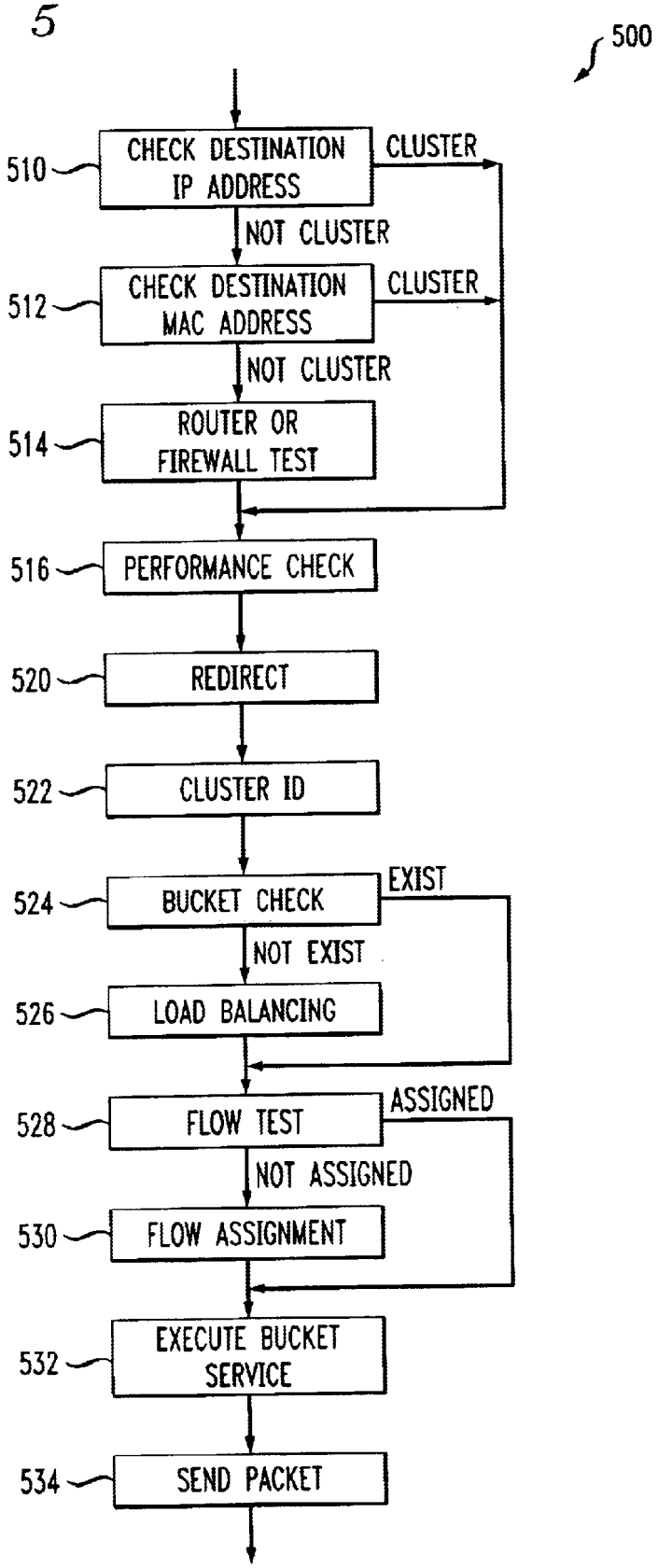
FIG. 5 is a flow diagram that illustrates a further implementation of a traffic distribution method.

Referring to FIG. 5, a flow diagram illustrates a traffic distributions method 500. In a check destination IP address operation 510, a traffic distributor checks the destination IP address of a packet to determine whether the destination IP address is a cluster address. If so, the traffic distributor in a performance check operation 516 verifies performance of routers within the cluster, and then may redirect flow in a redirect operation 520 if warranted by results of the performance check operation 516.

If the check destination IP address operation 510 determines that the destination IP address is not a cluster address, then, in a test destination MAC address operation 512, the traffic distributor checks to determine whether the destination MAC address is a cluster address. The destination MAC address matches the cluster address when a Proxy ARP is used to indicate to attached routers that the MAC address of the network flow controller is used when sending packets to any of the configured cluster IP addresses. If the MAC address matches the cluster address, the traffic distributor in the performance check operation 516 verifies performance of routers within the cluster, and then may redirect flow in the redirect operation 520 if warranted by performance check results.

If the test destination MAC address operation 512 determines that the MAC address is not a cluster address, then, in a router or firewall test operation 514, the traffic distributor performs router/firewall pooling, using the MAC address to determine whether the MAC address specifies a router or a firewall. Pooling is described in more detail in co-pending application Ser. No. 09/540,238 entitled "Firewall Pooling in a Network Flowswitch."

In the redirect operation 520, the traffic distributor redirects traffic to one of the routers or firewalls in the cluster, if redirection is warranted. Generally, traffic is redirected within routing cluster elements for any new packet for string of packets. Thus the first packet in a flow is generally redirected and subsequent packets are directed to the same routing cluster element as the first packet. A first redirection operation is a set cluster identifier operation 522 in which the cluster address in the form of either the MAC address or the destination IP address is set to identify the cluster data structure. A bucket check operation 524 determines whether at least one bucket exists in a cluster data structure. A load balancing operation 526 retrieves an appropriate bucket that attains load balancing.

A flow test operation 528 determines whether the flow is assigned to the bucket and, if not, performs a flow assignment operation 530 that assigns buckets to a server. The traffic distributor executes a bucket service 532 with the buckets used to forward data requests from clients to servers. A packet is then sent to the firewall in send packet operation 534.

Figure 6:
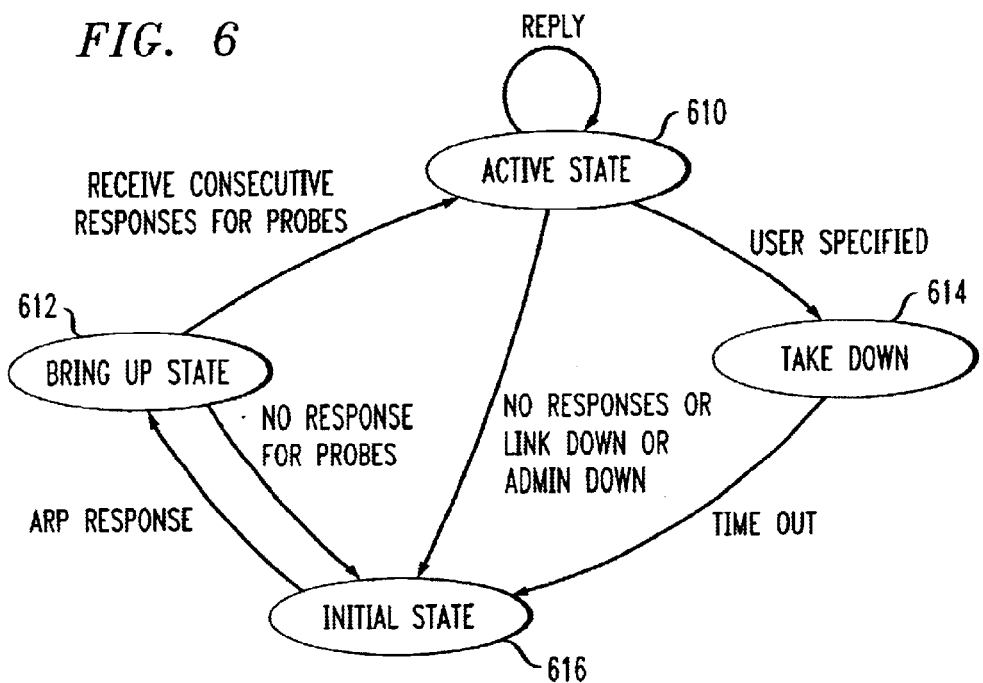
FIG. 6 is a schematic state diagram showing operational states of a technique for distributing traffic using clustering.

Referring to FIG. 6, a schematic state diagram shows operational states of a technique for distributing traffic by using clustering. In an Initial State 616, routers or firewalls in a cluster are inactive and no messages are routed between the servers and clients. A cluster is configured in the Initial State 616. The Initial State 616 is receptive to ARP probe methods for monitoring the routers in the router cluster. An ARP response while in the Initial State 616 causes a state transition to a Bring-Up State 612. In the Bring-Up State 612, the receipt of consecutive responses to ARP probes causes a transition to an Active State 610. If no responses for ARP probes are received, the state transitions from the Bring-Up State 612 back to the Initial State 616. In the Active State 610 regular replies are made to the ARP probes while active traffic distribution takes place.

Several conditions terminate the Active State 610. If no responses for ARP probes are received, the state transitions from the Active State 610 to the Initial State 616. Similarly, termination of a link or an administrator request to terminate the Active State 610 cause the Active State 610 to transition to the Initial State 616. A user-specified command cause the Active State 610 to transition to a Take-Down State 614 which, in turn, transitions to the Initial State 616 upon the occurrence of a time-out.

Figure 7:
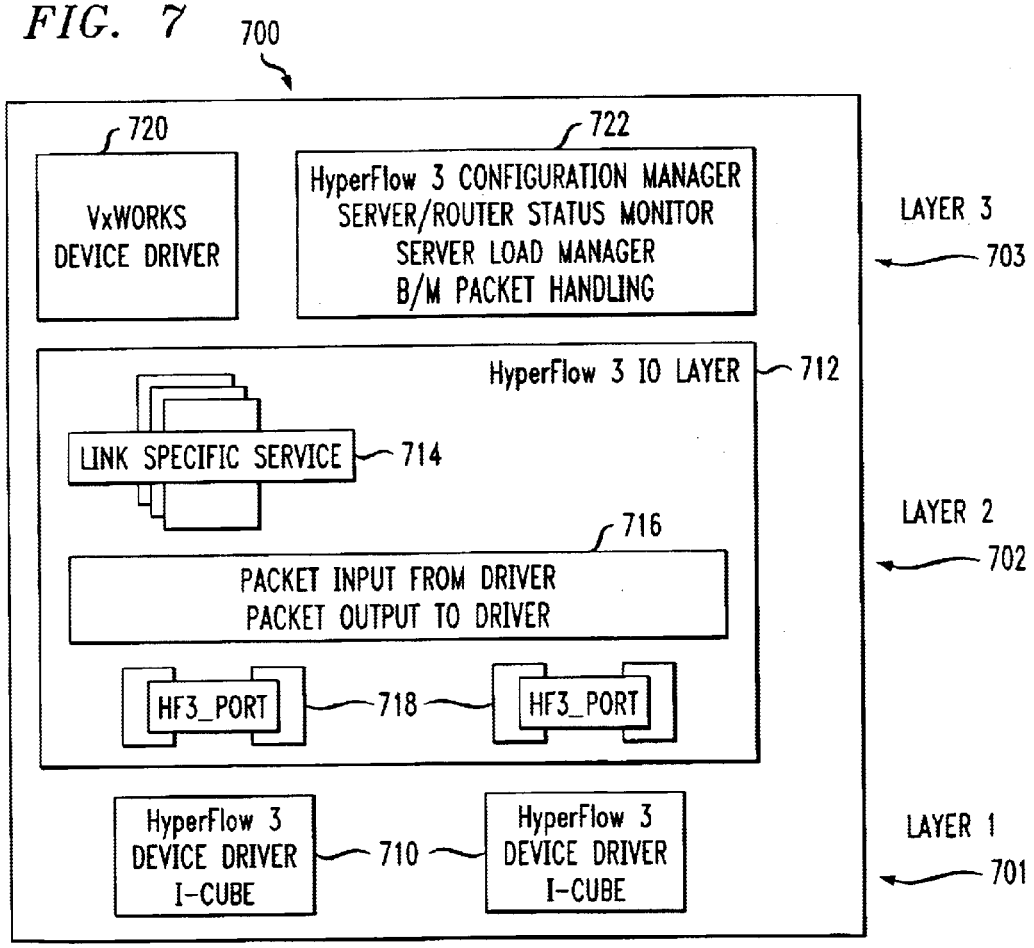
FIG. 7 is a schematic block diagram showing a system architecture including an arrangement of packet forwarding layers for a packet-forwarding software module.

Referring to FIG. 7, a schematic block diagram shows a system architecture including an arrangement of packet forwarding layers for a packet-forwarding software module. The packet-forwarding module defines clustering functionality and interfaces for either router clusters or firewall clusters. Packet-forwarding software executes on a commercial processor in combination with a commercially-available switching chip-set. The packet-forwarding software executes in conjunction with load-balancing software.

A suitable load balancing software is described in co-pending application Ser. No. 08/992,038, now U.S. Pat. No. 6,601,084, entitled "Dynamic Load Balancer for Multiple Network Servers." It uses hashing to separate data requests from clients into a plurality of buckets to consistently balance the load on a plurality of servers. Buckets are dynamically assigned to the server having the lightest load as necessary. The load balancer tracks the state of each server. A server is in the non-operational state if deemed unable to perform the service. The load balancer maintains a list of operation servers and assigns load only to servers that are operational. A server fault tolerance mechanism in the load balancer detects when a server goes down and redistributes the load to the new set of operational servers. When a previously non-operational server becomes operational, traffic is redistributed over the new set of operational servers. Redistribution does not disrupt existing client-server connections.

The packet-forwarding software supports several aspects of operation, including switching, high availability, fault tolerance, clustering, and Ethernet switching.

At a base level, the packet-forwarding layer structure 700 has device-driver layers 710 in a layer 1 701. In a layer 2 702, an IO layer 712 overlies the device-driver layers 710 and includes a link-specific service 714, and packet communications 716 including packet input from a drive 3 and packet output signals to the driver. The IO layer 712 communicates with the device-driver layer 1 710 via ports 718. In a layer 3 703 overlying the IO layer 712 are a VxWOrks Device Driver 720 and a configuration manager 722 that supports various functionality including server/router status monitoring, server load management, and bill of material packet handling.

Packet forwarding occurs when a network flow controller receives a packet from a specific port and the packet is destined for a device on a network. Flow is controlled based on the port type of the port at which traffic is received and by the layer 3 Internet protocol (IP) address of the destination. The module receives a packet from one device driver and forwards the packet to another device driver. A separate Service Access Point (SAP) is defined by the packet forwarding software and identifies each port. The packet-forwarding module includes a plurality of forwarding handlers including a handler for packet forwarding for Network Port types, and an IO layer Applications Programming Interface (API). The packet-forwarding software interfaces to modules including a server/cluster software module, a router/pool software module, a bucket state machine, and a traffic distribution module.

The packet forwarding module receives packets from a device driver of the network flow controller and forwards the received packets to another device driver. The type of service that a packet receives is based on the type of link. Link types include server, router, and network types.

Router and firewall clustering functionality supports scaling of routers and firewalls without having to reassign default gateways and static routes to any node in a subnet behind the router or firewall. All nodes in a LAN can use one gateway layer 3 703 address and the network flow controller will distribute the traffic to different routers/firewalls in the cluster, attaining high-availability and fault-tolerance.

For firewalls, additional supports managers a flow state using "sticky" connection features. The network flow controller supports multiple router/firewall clusters, in one illustrative configuration up to four. Network objects in a LAN use the router/firewall cluster as a default gateway to connect to additional networks. The network flow controller assumes that the router/firewall cluster has forwarding knowledge for the connections. Traffic sent to a layer 2 702 address is forwarded to the specific router/firewall depending on the load on the routers/firewalls in the cluster.

The packet forwarding software includes a plurality of major functions including a "port handler initialization" function, a "packet forwarding IO layer" API, a "packet forwarding packet from Network type port" function, and a "packet forwarding to Cluster handler" function. Other functions include a "get aggregate flow channel (bucket)" function, a "get IP address to determine load a balancing" function, a "packet forwarding packet to pool member" function, and a "packet forwarding packet to pool member" function.

The packet forwarding module port handler initialization function initializes the port function handlers and sets the port type. The packet forwarding module port handler initialization function has a synopsis of fwd_setPortType (port_t, *pszPort, int type) and includes two parameters, a port_t pointer to the port parameter and an inttype designator of a type to which the port is set. One implementation of the port handler initialization function is as follows:

```
If( port is NETWORK)
{
    switch(port type)
    {
        case SERVER:
            decrement object count on the port;
            break;
        default:
            break;
    }
}
switch( port type )
{
    case SERVER:
        set type to SERVER;
        increment object count on the port;
        set link handler to pf_inputPacketFromServerPort( );
        break;
    case ROUTER:
        set type to ROUTER;
        increment object count on the port;
        set link handler to pf_inputPacketFromRouterPort( );
        break;
    default:
        if (server object count and router object count is 0) {
            set type to NETWORK;
            set link handler to pf_inputPacketFromNetworkPort( );
        break;
}
```

The packet forwarding IO layer API is a function that handles incoming packets and has a synopsis fwd_inputPacket (cookie_t *pCookie, data_t *pszData). The parameters include Cookie_t that identifies a port cookie from the driver and a data_t pointer to the data. The packet forwarding IO layer API defines local and global variables, validates the port header size, validates the source port, gets the system run mode and required parameters, and gets the packet type from the data. In an illustrative system, the packet forwarding IO layer API function operates as follows:

```
Switch (type)
{
    case ETHER_TYPE_IPV4:
        call the link handler to process IP packet;
        break;
    case ETHER_TYPE_ARP:
        call the ARP input handler
        break;
    default:
        if (Multicast packet)
            Broadcast to all ports except port it came on
        Else
            Send packet to the MAC address from the table
        Break;
}
```

The packet forwarding packet from Network type port function is a function handler for a packet coming in on a Network type port and has a synopsis of fwd_inputPacketFromLinkType. Parameters of the function include a port_t Pointer to the port, and a data_t Pointer to the data. The packet forwarding packet from Network type port function defines and/or initializes local and/or global variables, then gets the destination IP address from the data. Pseudocode describing operation of the packet forwarding packet from Network type port is as follows:

```
if (destination is one of our clusters)
{
    call the cluster handler;
    return;
}
if (destination is the operating system)
{
    if (source port is a firewall type port)
    {
        if (packet is an ICMP packet)
        {
            if (group=fwdGetGroupFromPeerIp(port, data))
            {
                ICMP peer IP Handler
                Return;
            }
        }
        if (system access is not disabled)
        {
            queue packet for the operating system;
            return;
        }
    }
    if (packet is Multicast)
    {
        Create duplicate packet and Queue to operating system;
        Broadcast packet to all port except for it came in on.
        Return;
    }
    if (Check for pool member by MAC address)
    {
        if (Router redirection set)
        {
            call the redirection handler;
            return;
        }
        /* Check for Router Fault Tolerance */
        if (pool Group is not null and pool Group forwarding set)
        {
            call Pool fault tolerance handler (fwd_poolMemhndlr( ));
            return;
        }
    }
    if (router type cluster or firewall type cluster)
    {
        call cluster handler;
        return;
    }
}
Free data;
return;
```

The packet forwarding to Cluster handler function handles forwarding of packets to the cluster and has a synopsis Void fwd_to Cluster Handler (CLUSTER_T *pCluster, DATA_T *pData, PORT_T *pPort). The parameters include a Cluster_t pointer to the cluster data, a Port)t pointer to the port, and a Data_t pointer to the data. The packet forwarding to Cluster handler function defines and/or initializes local and/or global variables. In an illustrative system, the packet-forwarding to Cluster handler function operates as follows:

```
if (a redirection member record is included)
{
    update the L2 address;
    send packet to the destination server;
    return;
}
```

Following the function, the packet is sent to the router/firewall in the cluster. The function gets the bucket for the flow based on the cluster group type and executes the bucket state machine.

The get aggregate flow channel (bucket) function returns the pointer to the aggregate flow, which is also called the bucket, for the cluster. The get aggregate flow channel (bucket) function has a synopsis of BUCKET-T *getAggregateFlowChannel (DATA_T *pData, PORT_T *pPort, CLUSTER_T *pCluster, UINT32_T *puiIndex). The parameters include a Cluster_t pointer to the cluster data, a Port_t pointer to the port, a Data_t pointer to the data, and a UINT32 reference pointer to the bucket index. The function returns BUCKET_T*. The get aggregate flow channel (bucket) function defines and/or initializes local and/or global variables and then gets the layer 3 address based on the cluster type. The function gets the aggregate flow index from the IP address and returns the pointer to the bucket.

The get IP address to determine load balancing function returns the layer 3 address which determines the load calculating variable. The get IP address to determine load balancing function has a synopsis of UINT32 ipv4_loadDeterminatinoAddr (DATA_T *pData, PORT_T *pPort, CLUSTER_T *pCluster). The parameters include the Cluster_t pointer to cluster data, the Port_t pointer to the port, and the Data_t pointer to the data. The function returns a UINT32 IP address. The get IP address to determine load balancing function is described by pseudocode as follows:

switch (Cluster Get Group Type)

```
{
case CROUTER:
    return destination IP address from the packet.
case CFIREWALL:
    switch (get firewall zone)
    {
    case FIREWALL_INTERNAL:
        return destination IP address from the packet.
    case FIREWALL_EXTERNAL:
        return source IP address from the packet.
    case FIREWALL_NONE:
    default:
        return sum of source and destination IP addresses from packet.
    }
case CSERVER:
case CVPN:
default:
    return source IP address from the packet.
}
```

A packet forwarding packet to pool member function is a handler for pool member redirection and router/firewall pooling and has a synopsis of Void fwd_toPoolMemberHandler (VMEMBER_T *pMember, PORT_T *pPort, DATA_T *pData). The parameters include a Vmember_t pointer to member data, a Port_t pointer to the port, and a Data_t pointer to the data. The function returns Void. The packet forwarding packet to pool member function defines and/or initializes local and/or global variables, then functions according to the following pseudocode:

```
if (member redirection to a cluster exists)
{
    forward to a cluster handler;
    return;
}
```

```
else
{
    forward packet to forwarding router;
    return;
}
```

A packet forwarding packet to forwarding member function forwards traffic to the forwarding member. The function has a synopsis of Void fwdPacketToForwardingMember (VMEMBER_T *pMember, DATA_T *pData). The parameters include a Vmember_t pointer to the member data and a Data_t pointer to the data. The function returns Void. The packet forwarding packet to pool member function first defines and/or initializes local and/or global variables, then initializes the original member and gets the pool from the member data. The function pseudocode is, as follows:

```
if (member found forwarding member in pool)
{
    copy the layer 2 address from the member data into data;
    send packet to the link from the member data;
    return;
}
else
{
    if (send packet to original member failed)
    {
        freedata;
    }
    return;
}
```

Figure 8:
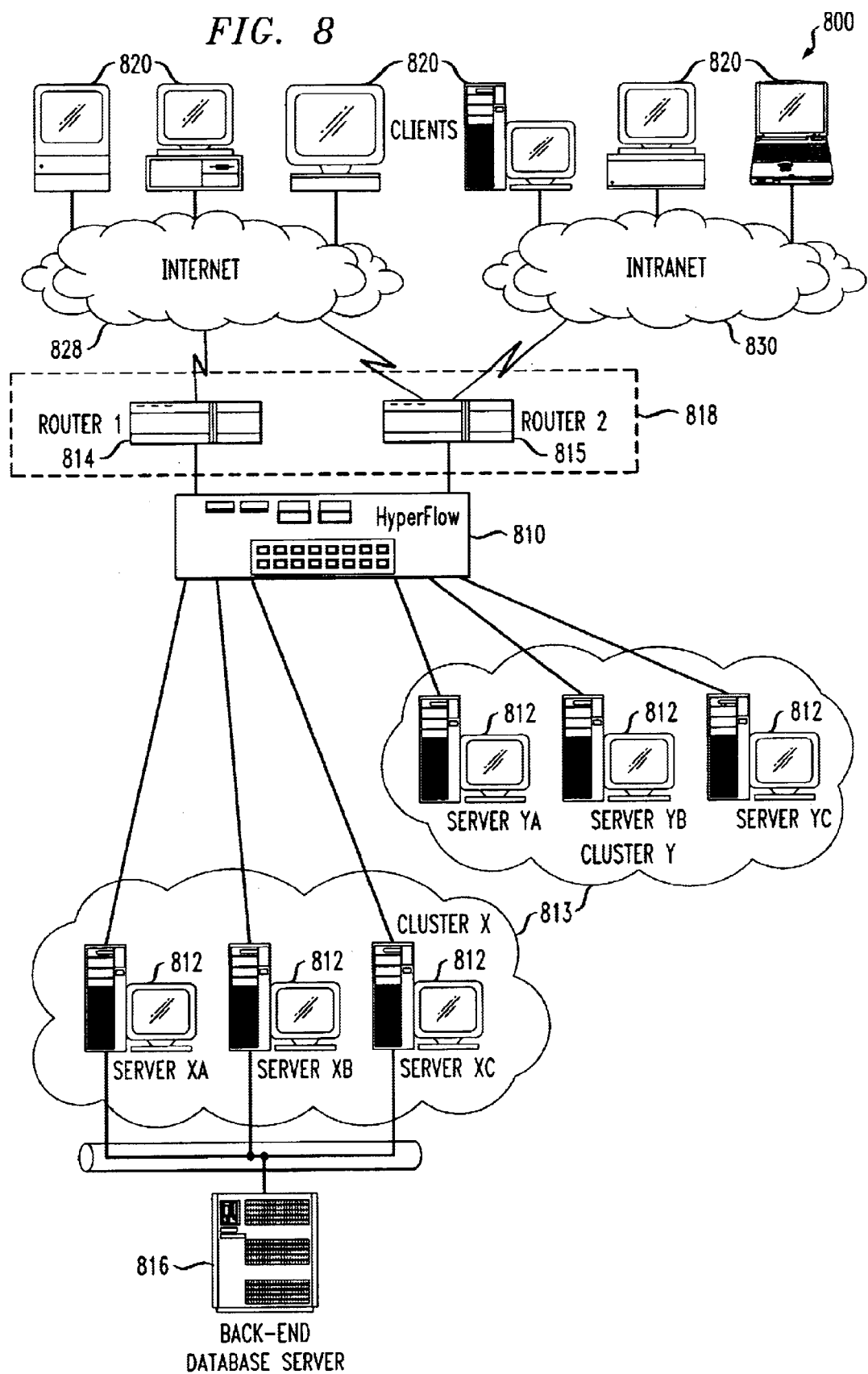
FIG. 8 is a schematic block diagram showing an example of a clustering system within a network topology.

Referring to FIG. 8, a schematic block diagram shows an example of a clustering system and network flow controller 810 within a network topology 800. The example shows a network flow controller 810 that arranges system elements into clusters at stages of communication flow from servers to clients. The network flow controller 810 is connected to a plurality of servers 812 and arranges the plurality of servers 812 into server clusters 813, including a cluster X and a cluster Y. In the illustrative example, servers 812 in the cluster X are interconnected to a back-end database server 816. The network flow controller 810 is also connected to Router1 814 and Router2 815 and arranges the two routes into a router cluster 818. The routers are connected to one or more networks, such as an Internet 828 and an Intranet 830. The networks are further connected to clients 820.

In an illustrative system, a network flow controller 810 is available with 8 or 16 auto-negotiating Fast Ethernet ports to supply a high speed interconnect for server-server and client-server communication.

The network flow controller 810 attains high-availability through fault tolerance. Within the network flow controller 810, dual power supplies and intelligent fans ensure that operation continues even under adverse environmental operating conditions. Two or more network flow controllers 810 may be linked for redundancy that eliminates a single point of failure within the cluster. Multiple network flow controllers 810 can cooperate in an active-standby or active-active fail-over mode. The network flow controllers 810 can exchange heartbeat and configuration information over a dedicated Fast Ethernet port.

The network flow controller 810 intelligently distributes Internet protocol (IP) traffic across multiple replicated servers 812. The network flow controller 810 uniquely identifies a group of replicated servers 812 by a single IP address. Traffic destined for the cluster IP address is distributed across the servers 812 within the server cluster 813 by the network flow controller 810. All clients 820 accessing the servers 812 are presented only the cluster EP address with the presence of the plurality of replicated servers 812 and the identity of the specific server to which the traffic is forwarded within the cluster hidden.

In the illustrative system, the network flow controller 810 configures two server clusters 813, Cluster X and Cluster Y, with a plurality of servers 812 associated with each cluster 813. Cluster X has three servers 812: Server XA, Server XB, and Server XC that supply access to a back-end database server 816. Cluster Y also has three servers: Server YA, Server YB, and Server YC. Two routers, Router1 814 and Router2 815, supply access to the servers 812 over an Intranet 830 and an Internet 828. A potentially large number of clients 820 access the servers 812 through the routers.

The servers 812 in Cluster X are individually capable of supplying the same set of services to clients. The Cluster X servers 812 are 'front-ends' for a shared server which maintains data synchronization. The clients 820 view any server 812 within the cluster as being capable of processing requests. The network flow controller 810 groups functionally similar servers 812 in a cluster to distribute a load from the clients 820 amongst the plurality of servers 812.

The servers 812 in Cluster Y may perform an entirely different set of services for clients 820. In one example, the servers 812 in cluster Y are independent replicated servers with timing connections to maintain data synchrony. From the perspective of clients 820, any server within cluster Y is capable of processing requests. The network flow controller 810 fits into a network topology between a router and the servers. From the perspective of network flow controller 810, ports that connect to the servers 812 are known as Server Ports. The network flow controller 810 ports that connect to the routers are called Router Ports.

Each server has a unique IP address, called a server management address that can be used for administration purposes. Servers within a cluster also share a same 'logical' IP address, called a cluster IP address. Clients 820 direct requests to the cluster IP address, not to a server management address.

The network flow controller 810 uses Proxy ARP to indicate to attached routers that the MAC address of the network flow controller 810 should be used when sending packets to any of the configured cluster IP addresses. The network flow controller 810 responds to ARP requests for the cluster IP address by sending the network flow controller 810 MAC address, ensuring that all traffic destined for the servers 812 within a cluster is sent to the network flow controller 810 by the routers.

When network flow controller 810 receives a packet from a router, the destination IP address determines the cluster for which the packet is targeted and the source IP address determines the server within the cluster to which network flow controller 810 will forward the packet.

When a packet arrives from a new client, i.e., a client having a source IP address that is not yet mapped, network flow controller 810 associates the client with the least loaded server at the time of arrival.

A "static" association exists between a client source IP address and the server within a cluster that processes packets from the client. In the static association, once the association is configured, the association remains for subsequent packets from the same source. A common term for the static association is a flow. The flow between the selected server and the source IP address is timed. While traffic continues to arrive from the source IP address destined for the cluster IP address, the association remains valid. If the traffic from the source IP address to the cluster IP address stops for more than a selected period, the association terminates. Internal to network flow controller 810, a hash table stores flow information. A hash table maps a large set of values into a much smaller set so that two different source IP addresses may be mapped to the same table entry. When multiple IP addresses are mapped to the same table, the source IP address that arrives later uses the same association as was set by the first source IP address even though the flow is distinct and different. The hash table permits aggregation of flows. As new flows arrive, the new flows will either create new associations if the mapped hash entry is unassigned, or the new flows use previously configured associations if the mapped hash entry is already assigned. The network flow controller 810 maintains a separate hash table for each cluster.

Network flow controller 810 continually monitors the servers 812 to detect non-operational conditions. If a servers 812 within a cluster fails, network flow controller 810 reassigns all hash table entries that are associated with the failed server to other servers within the cluster.

Routers send packets destined for the cluster IP addresses to network flow controller 810. The packets have a destination MAC address associated with network flow controller 810 and a destination IP address associated with the cluster. Once network flow controller 810 has determined which server is to receive forwarded packets, the network flow controller 810 replaces the destination MAC address to identify the selected server and sends the packet via the interface to which the server is attached. The server has the same IP address as the cluster IP address, so no change is made to the packet IP header or payload.

For network traffic in the opposite direction, from the server 812 back to a client 820, network flow controller 810 simply forwards the MAC or IP header to the router without modification. The network flow controller 810 does not modify the MAC or IP header of the packets and the packets are forwarded by the network flow controller 810 switches.

In addition to monitoring the operational state of the servers 812, network flow controller 810 similarly monitors the attached routers. If a router fails, network flow controller 810 intercepts packets destined for the failing router and rewrites the MAC destination address to address an alternative router. For example, if Router2 815 fails, then Router1 814 is used to ensure continued connectivity to the Internet 828.

The network flow controller 810 intelligently distributes traffic by directing client traffic that is sent to a cluster IP address to specific servers within the cluster. The network flow controller 810 distributes traffic on a per-aggregated flow basis.

Traffic from any client having a source IP address that is mapped to a flow is sent to the assigned server. The network flow controller 810 rewrites the destination MAC address to the address of the assigned server, replacing the address of network flow controller 810. For each packet, network flow controller 810 determines the cluster to which the packet is targeted and the assigned server for the source IP address. The network flow controller 810 then rewrites the destination MAC address to be the address of the assigned server and forwards the packet on the appropriate server port.

At any time, any number of clients can use the same flow. Network flow controller 810 does not normally keep any information in terms of count or actual client IP addresses that associates particular clients to a particular flow.

Association of a server with a particular collection of client IP addresses is timed. After a period of inactivity in which no packets are received from any clients mapped to that flow, the association is purged.

Potentially, each server within a cluster may have multiple IP addresses. One of the server IP addresses must be the address of the cluster to which the server is associated. The server may have other EP addresses used for management and administration purposes. The network flow controller 810 does manage traffic for the server management IP addresses. Traffic management is only performed on traffic destined for the cluster IP address. Traffic destined for server management IP addresses is handled by switches within network flow controller 810 and not processed by the processor in the network flow controller 810.

When a large number of clients 820 may be accessing the servers 812 through a proxy server, network flow controller 810 more evenly distributes traffic. The network flow controller 810 can be configured to include a TCP source port number in packet information used to distribute traffic. When enabled, the traffic distributor, which is configurable on a per-cluster basis, identifies a flow by using the packet source IP address, destination IP address and, if available, the TCP source port number. Non-TCP traffic continues processing using Layer 3 information including source and destination IP addresses and is not affected by the traffic distributor.

The network flow controller 810 implements traffic distribution methods that allow an administrator to tune the traffic management. The network flow controller 810 selects a server when a flow from a client arrives which was not recently assigned to a server. The network flow controller 810 supports a plurality of traffic distribution methods including round-robin, least-used flow, and weighted methods.

In the round-robin method, network flow controller 810 simply steps through the servers in the cluster and selects the next in sequence regardless of actual server loads. Servers are held in a circular list structure with position determined by the order of configuration.

In the least-used flow method, network flow controller 810 selects the server that has been forwarded the least amount of traffic from clients. Return traffic from the server is not considered in the determination.

In the weighted method, network flow controller 810 selects the least loaded server within the cluster based on the user-assigned server weight and the measured server load.

Session persistence continues to be maintained for all traffic distribution methods.

The network flow controller 810 determines server loads using a variety of techniques in two general categories, non-intrusive and intrusive. In the non-intrusive techniques, the server load metric is independent of the server, operating system, and hardware platform. Non-intrusive techniques use information from sources external to the server. Two non-intrusive server load metrics are probe response time and network utilization metrics.

In the probe response time metric, the network flow controller 810 tracks the time to probe a server and is available regardless of the number of servers configured on the port.

Network utilization metric involves tracking the amount of data transferred between network flow controller 810 and the server in terms of packets and bytes sent and received in both directions. Network utilization can only be used when a single server is configured on the port.

The intrusive category of server load metric employs the administrator to install software on the server and has the advantage of accurately determining the load based on internal server information. The software component that loads onto the server is called a server agent. The server agent calculates the load based on CPU utilization. Windows NT and UNIX server platforms are supported.

The administrator configures the server load determination method based on the server operating environment.

The network flow controller 810 arranges servers 812 into clusters. Granularity of the traffic distribution performed by network flow controller 810 is configurable by the administrator. In an illustrative system, by default network flow controller 810 holds information for 1024 aggregated flows for each cluster and supports a maximum of 64 such clusters.

For administrators having a requirement for traffic distribution to occur with a finer granularity, network flow controller 810 may be configured to hold information for up to 16384 aggregated flows. Using fine granularity, network flow controller 810 supports a maximum of 4 clusters.

In situations where the number of supported clusters is important, network flow controller 810 can be configured to support a maximum of 1024 clusters with no more than 2048 servers total, each holding information for 64 aggregated flows.

Each cluster is assigned a unique IP address. The same IP address is also assigned to each server within that cluster. The network flow controller 810 does not perform IP address translation as part of traffic distribution techniques.

Graceful server takedown introduces the concept of secondary flows. Normally a flow is designed to supply all IP addresses that map to the assigned server. A secondary flow is designed for a specific IP address only. Secondary flows exist only during graceful take-down of a server. During normal server operation, secondary flows do not exist. Secondary flows can be considered as branching off, as a linked-list, from an associated cluster flow. Only flows within a cluster that are affected by a server takedown have associated secondary flows. The number of secondary flows associated with a cluster flow depends on the number of different IP addresses that are mapped into the flow within a given period. For cluster flows that are mapped to only a small number of IP addresses, the length of the secondary flow list is small. The available runtime resources determine the upper limit on the number of secondary flows.

The network flow controller 810 permits the administrator to configure and connect multiple servers 812 per port, permitting usage in an environment with a large number of servers without "stacking" multiple units. A single network flow controller 810 unit, or a pair when used in a fail-over topology, can cluster a large number of servers. Multiple server configuration exploits the "all/IP" technology used in network flow controller 810.

The network flow controller 810 avoids usage of Network Address Translation (NAT) and NAT's inherent performance penalties and interoperability drawbacks by aliasing the interface IP address on the server. Aliasing of the cluster IP address on the server IP loopback interface allows a server to belong to many clusters and reside on the same LAN segment as other servers, even other servers that belong to the same cluster, without creating problems from duplication of IP addresses.

In an illustrative implementation, the network flow controller 810 supports up to 1024 clusters with up to 2048 total servers. No restriction is imposed on the number of servers on a single port so long as the total number of configured servers in the system does not exceed the imposed overall limit.

The network flow controller 810 allows an administrator to configure a number of "hot-standby servers" within the cluster most effectively for high-availability conditions with no possibility of server replication. The network flow controller 810 forwards traffic only to operational non-hot-standby servers in a cluster until the traffic exceeds the capacity of the non-hot-standby servers. Hot-standby servers remain idle although the network flow controller 810 does execute health-monitoring of the idle hot-standby servers. Once the capacity of the non-hot-standby servers is exceeded, network flow controller 810 selects a hot-standby server to forward cluster traffic for processing. In an illustrative implementation, network flow controller 810 selects hot-standby servers in a round-robin order based on the order of configuration.

The network flow controller 810 also controls traffic to direct specific types of traffic exclusively to one or more dedicated servers in a cluster. A dedicated server is a server that, though replicated, performs a unique service that is not offered by other servers. In one example of an implementation, an administrator can configure up to five different port numbers and respective associated servers in the cluster. The network flow controller 810 only forwards traffic of the defined types to the specified dedicated server regardless of server loads.

The network flow controller 810 supports application probes. Application probes allow an administrator to control analysis of the network flow controller 810 in determining health of servers within a cluster. The administrator completely controls techniques for testing the cluster and defining a standard for a good response.

The network flow controller 810 supports an application probe for the HTTP server. At regular intervals defined by a preset "keep-alive" interval, network flow controller 810 issues a GET request to the management IP address assigned to the server. The administrator typically configures the application probe according to port, requested URL, and response codes that are not indicative of an error condition.

The network flow controller 810 also supports an application probe that uses only ARP requests and replies. At regular intervals, defined by the "keep-alive" interval, network flow controller 810 issues an ARP Request to the server.

The network flow controller 810 is generally located at a key position within a network topology and is well-suited to enforce policies including traffic redirection.

The network flow controller 810 can direct traffic to Proxy Servers that cache the contents of frequently accessed web pages locally, improving response time to a web browser user and freeing expensive (WAN) network bandwidth for the network administrator. Proxy Server operation is both disk and CPU intensive, so that Proxy Servers are prime candidates for clustering. Effectiveness of a Proxy Server is proportional to usage. Users must configure the web browser to directly interact with the Proxy Servers rather than accessing a web-site directly. When the administrator cannot enforce a users voluntary use of Proxy Servers, network flow controller 810 can be used to transparently redirect HTTP traffic to a Proxy Server without the user configuring the web-browser. Redirection is applied to traffic originating from network-type ports, not server or router ports, and is destined for user-configured router IP addresses.

The network flow controller 810 not only controls HTTP Redirection, which is a well understood and accepted concept, but also controls redirection for other types of IP traffic. IP Redirection is applied to traffic originating from network-type ports, not server or router ports, and is destined for user-configured router IP addresses.

The network flow controller 810 implements server fault intolerance within a cluster by periodically checking individual servers within a cluster to ensure that the servers are operational. At regular intervals, a selectable "keep-alive" interval, network flow controller 810 sends application probes to each server and waits for a reply. If a server does not respond to a selectable down-count number of consecutive application probes, the server is classed within a "down" condition.

Whenever a server fails to respond to an application probe, network flow controller 810 uses other servers within the cluster to handle any assigned flows. Network flow controller 810 reassigns any flows that are currently assigned to the server to the most suitable servers within the cluster. Active client-server sessions using the server are affected.

Even while a server is down, network flow controller 810 continues to send applications probes to ensure detection of the server upon recovery. A selectable "bring-up" count number of consecutive replies is received before network flow controller 810 marks the server as up again. When a failed server is again usable, network flow controller 810 does not automatically reassign any previously assigned flows that would adversely affect any active client-server sessions. The again-usable server, probably the least loaded in the cluster, is used only in new flow assignments.

The network flow controller 810 implements router fault tolerance through usage of router pools. A cluster is considered a group of functionally-equivalent servers. Similarly, a router pool is a group of route-equivalent routers. All routers within a router pool can route packets to the same destinations, although routing paths may vary. For example, one router in a pool may have access to a dedicated leased line connection. Another router may use a dial-up connection.

The network flow controller 810 periodically checks routers in a pool to ensure an operational condition. Two techniques for detecting the operational state of routers are the Address Resolution Protocol (ARP) and ICMP Router Discovery Protocol (IRDP).

The network flow controller 810 implements ARP by sending, at regular intervals, ARP Request packets to each router in the pool, then waiting for a reply. If a router does not respond to a down-count number of consecutive ARP Requests, a router is marked as down. While a router is down, network flow controller 810 continues to send ARP Requests to the inoperative router. A "bring-up" count number of consecutive replies is received before network flow controller 810 marks the router as up again.

Routers periodically multicast ICMP Router Advertisement messages advertising interface addresses. The network flow controller 810 implements IRDP by detecting the advertisement messages and recording the message receipt time and the TTL value for each router address included in the messages. The router is considered to be down if a second ICMP Router Advertisement is not received before the TTL elapses. The network flow controller 810 does not transmit any ICMP Router Solicitation messages but simply waits for the messages, possibly extending the time for determining whether a router is operational.

Router fault tolerance allows servers to retain network connectivity without reconfiguration. The servers are not directly affected when outbound traffic is redirected by network flow controller 810 to an alternative, but route-equivalent, router. While the routers are operational, network flow controller 810 directs switches to perform packet forwarding from the servers to the routers. The network flow controller 810 does not process the packets. When network flow controller 810 detects that a router has failed or is informed by the administrator that a router is down, network flow controller 810 redirects any packets received from the servers and bound for the failed router to another router in the pool. Redirection occurs at Layer 2. The network flow controller 810 rewrites the destination MAC address of any packet that is meant for the inoperative router. The replacement destination MAC address is the MAC address of another router from the router pool. If no operational routers remain within a router pool, network flow controller 810 discards the traffic.

The network flow controller 810 determines which router replaces a failed router by simply choosing the first operational router within the pool. The network flow controller 810 contains no configurable weightings for routers to indicate usage preference. All routers are treated equally.

When an inoperative router becomes operational again, network flow controller 810 stops redirecting the traffic to the other router from the pool. The network flow controller 810 returns to using ordinary switching to forward packets to the router. The network flow controller 810 then terminates packet processing.

The network flow controller 810 uses Proxy ARP to effectively "hide" servers within a cluster. The network flow controller 810 ensures that devices connected to the Router Ports interact with the proxy rather than directly with the servers for any cluster-related activity.

Network flow controller 810 uses Proxy ARP to ensure that packets destined for any of the cluster IP addresses are sent to network flow controller 810 rather than directly to the servers within the clusters. When a router attempts to send a packet to a cluster but is not informed of the destination MAC address, the router sends an ARP Request packet requesting a station with the IP address indicated in the ARP Request packet to reply with station MAC address. The network flow controller 810 responds to an ARP Request packet with a cluster IP address received on a Router Port by sending the MAC address of the network flow controller 810. The router then uses the network flow controller 810 MAC address when sending packets for the cluster IP address. The network flow controller 810 receives all traffic from Router Ports directed at clusters.

When a server attempts to send a packet to a particular destination IP address on the same subnet but does not have the appropriate destination MAC address, the server sends out an ARP Request packet. The network flow controller 810, on receiving an ARP Request from a server, intercepts the ARP Request. The network flow controller 810 modifies the ARP Request source information including MAC and IP addresses such that the information appears to have been sent by network flow controller 810 rather than by one of the servers. The modified ARP Request is then broadcast. Upon receiving a reply, network flow controller 810 modifies the ARP Reply destination information including MAC and IP addresses. A copy of the ARP Reply is sent back directly to each server within the cluster.

If network flow controller 810 receives an ARP Request from a server for a failed router, network flow controller 810 replies back with the MAC address of an alternate operational router from the pool. The server functions as though the failed router is operational and sends traffic to the alternate router.

Some servers use ARP to detect duplicate IP address assignments upon power-up. The servers send ARP Request packets requesting a response from the host with the same address. No reply is received if the server IP address is unique within the sub-network. The network flow controller 810 ensures that a server in a cluster does not detect other servers within the cluster. The network flow controller 810 discards any ARP Request packet that originated from a server, for example the source IP address is the address of the cluster, and is targeted to the cluster IP address or any server management IP address.

Network flow controller 810 supports two fail-over modes of operation to eliminate single points of failure, including an active-standby mode and an active-active mode. In Active-Standby mode, an active network flow controller (A) has a hot standby network flow controller unit (B) constantly monitoring health and status of the A unit. The standby network flow controller unit (B) is able to take over in less than 10 seconds, after detecting a failure. The Active-Standby fail-over solution fits easily into an existing network topology. The administrator need not change network interface cards, server configuration, cables, router configuration, or software to employ a hot-standby fail-over solution.

Active-Active mode is used for applications where high availability is paramount. Though sessions will be disrupted during a router/flow controller/server failure, no single failure affects server availability.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

In the claims, unless otherwise indicated the article "a" is to refer to "one or more than one".

What is claimed is:

1. A method of routing message traffic between a plurality of servers and a plurality of clients via routers, the method comprising:

creating a router cluster connected between the plurality of the servers and the plurality of the clients and containing a plurality of the routers for routing the message traffic between the servers and the clients, the router cluster being addressed by a logical Internet protocol (IP) address that is distinct from unique IP addresses of the routers contained within the router cluster; and distributing traffic between a server of the plurality of the servers and a client of the plurality of the clients via a router selected from among the routers contained in the router cluster, the router being selected on a basis of a packet destination IP address.

2. A method according to claim 1 wherein the creating operation further comprises:

assigning a single MAC address to the router cluster.

3. The method of claim 2 wherein:

distributing comprises addressing the traffic to the single MAC address; and replacing the single MAC address of the traffic with a MAC address of the selected router.

4. The method of claim 2 wherein:

distributing comprises a server of the servers addressing the traffic to both the packet destination IP address and the single MAC address; and a traffic distributor replacing the single MAC address of the traffic with a MAC address of the selected router.

5. The method of claim 2 further comprising:

receiving traffic from a client of the plurality of the clients at the router cluster;

addressing the traffic to the single MAC address; and replacing the single MAC address of the traffic with a MAC address of a destination one of the servers.

6. The method of claim 2 further comprising:

creating at least one server cluster each containing a plurality of the servers, each server cluster being addressed by a different logical Internet protocol (IP) address;

addressing the traffic to the single MAC address;

selecting a destination server cluster, for receiving traffic from a client of the plurality of the clients, on a basis of a destination address of the traffic, the destination address comprising the logical IP address of the selected server cluster;

selecting a destination server in the selected destination server cluster on a basis of a source address of the traffic, the source address comprising an IP address of the client; and replacing the single MAC address of the traffic with a MAC address of the selected destination server.

7. A method according to claim 1 wherein the creating operation further comprises:

assigning a unique MAC address to each router cluster of a plurality of the router clusters.

8. A method according claim 1 wherein the creating operation further comprises:

assigning the logical IP address to the router cluster.

9. A method according to claim 1 wherein the creating operation further comprises:

assigning, by an administrator, the logical IP address to the router cluster.

10. A method according to claim 1 wherein the creating operation further comprises:

specifying routers that are contained within the router cluster.

11. A method according to claim 1 further comprising:

monitoring health of the routers;

determining that the selected router is not operational; and in response to the detecting, selecting another router from among the routers contained in the router cluster on the basis of the packet destination IP address.

12. A method according to claim 1 wherein the distributing traffic operation further comprises:

selecting a router from among the plurality of routers contained within the router cluster for distributing outbound traffic from server to client based on the packet IP destination address.

13. A method according to claim 1 wherein the distributing traffic operation further comprises:

selecting a router from among the plurality of routers contained within the router cluster for distributing outbound traffic from server to client so that for any given server-destination connection flow a same said router is used for every outbound packet so long as the flow remains operational.

14. A method according to claim 1 wherein the distributing traffic operation further comprises:

selecting a router from among the plurality of routers contained within the router cluster for distributing outbound traffic from server to client so that a probability of any particular router being used for forwarding is the same.

15. A method according to claim 1 further comprising:

maintaining a list of operation flows.

16. The method of claim 1 wherein:

the packet destination IP address is an address of one of the clients which is a destination of the message traffic.

17. The method of claim 1 further comprising:

creating at least one server cluster each containing a plurality of the servers, each server cluster being addressed by a different logical Internet protocol (IP) address;

distributing traffic from a client of the plurality of the clients to a server cluster selected on a basis of a destination address comprising the logical IP address of the selected server cluster; and distributing the traffic from the client to a selected server in the selected server cluster, the selected server being selected on a basis of a source IP address identifying the client.

18. A computer readable storage medium for execution on a processor for routing message traffic between a plurality of servers and a plurality of clients via routers, the medium comprising:

an encoding defining:

a router cluster for connecting between the plurality of the servers and the plurality of the clients and containing a plurality of the routers for routing the message traffic between the servers and the clients, the routing cluster being addressed by a logical Internet protocol (IP) address that is distinct from unique IP addresses of the routers contained within the router cluster;

a list of the routers contained within the router cluster; and a selection of a router from among the routers contained in the router cluster for distributing traffic between a server of the plurality of the servers and a client of the plurality of the clients, the router being selected on a basis of a packet destination IP address.

19. A computer readable storage medium according to claim 18 further comprising:

an encoding defining a traffic distributor that distributes traffic between a server of the plurality of servers and a client of the plurality of clients via a router selected from among the routers contained in the router cluster, the router being selected on the basis of a packet destination IP address.

20. A computer readable storage medium according to claim 18 further comprising:

an encoding defining assigning a single MAC address to the router cluster.

21. The medium of claim 20 wherein:

the encoding defining a selection of a router defines addressing of the traffic to the single MAC address; and replacing the single MAC address of the traffic with a MAC address of the selected router.

22. The medium of claim 20 wherein:

the encoding defining a selection of a router defines addressing, by a server of the servers, of the traffic to both the destination IP address and the single MAC address; and a traffic distributor that replaces the single MAC address of the traffic with a MAC address of the selected router.

23. The medium of claim 20 further comprising:

an encoding defining addressing of traffic, received at the router cluster from a client of the plurality of the clients, to the single MAC address; and replacement of the single MAC address of the traffic with a MAC address of a destination one of the servers.

24. The medium of claim 20 further comprising:

an encoding defining at least one server cluster each containing a plurality of the servers, each server cluster being addressed by a different logical Internet protocol (IP) address;

addressing of the traffic to the single MAC address;

a selection of a destination server cluster, for receipt of traffic from a client of the plurality of the clients on a basis of a destination address of the traffic, the destination address comprising the logical IP address of the selected server cluster;

a selection of a destination server in the selected destination server cluster on a basis of a source address of the traffic, the source address comprising an IP address of the client; and replacement of the single MAC address of the traffic with a MAC address of the selected destination server.

25. A computer readable storage medium according to claim 18 further comprising:

an encoding defining assigning a unique MAC address to each router cluster of a plurality of router clusters.

26. A computer readable storage medium according to claim 12 further comprising:

an encoding defining a health probe manager that determines health of the routers in the router cluster and redirects traffic from the selected router that has failed to another router of the router cluster.

27. The medium of claim 18 further comprising:

an encoding defining a redirecting router for redirecting traffic when an active router fails.

28. The medium of claim 18 wherein:

the encoding defining a selection of a router defines selection of a router on a basis of the packet destination IP address of one of the clients which is a destination of the message traffic.

29. The medium of claim 18 further comprising:

an encoding defining at least one server cluster each containing a plurality of the servers, each server cluster being addressed by a different logical Internet protocol (IP) address;

a selection of a server cluster, for receipt of traffic from a client of the plurality of the clients, on a basis of a destination address comprising the logical IP address of the selected server cluster; and a selection of a server in the selected server cluster, for receipt of the traffic, on a basis of a source IP address identifying the client.

30. An apparatus for routing message traffic between a plurality of servers and a plurality of clients, comprising:

a router cluster for connection between the plurality of the servers and the plurality of the clients and containing a plurality of routers for routing the message traffic between the servers and the clients, the router cluster being addressed by a logical Internet protocol (IP) address that is distinct from unique IP addresses of the routers contained within the router cluster; and a traffic distributor that effects distribution of the message traffic between a server of the plurality of the servers and a client of the plurality of the clients via a router selected from among the routers contained in the router cluster on a basis of a packet destination IP address.

31. The apparatus of claim 30 wherein:

the router cluster has a single MAC address assigned thereto.

32. The apparatus of claim 31 wherein:

the traffic is addressed to the single MAC address; and the traffic distributor replaces the single MAC address of the traffic with a MAC address of the selected router.

33. The apparatus of claim 31 wherein:

the traffic is addressed by a server of the servers to both the packet destination IP address and the single MAC address; and the traffic distributor replaces the single MAC address of the traffic with a MAC address of the selected router.

34. The apparatus of claim 31 wherein:

the traffic from a client of the plurality of the clients is received by the router cluster and is addressed to the single MAC address; and the traffic distributor replaces the single MAC address of the traffic with a MAC address of a destination one of the servers.

35. The apparatus of claim 31 further comprising:

a definition of at least one server cluster each containing a plurality of the servers, each server cluster being addressed by a different logical Internet protocol (IP) address; wherein the traffic is addressed to the single MAC address; and the traffic distributor selects a destination server cluster for receiving the traffic from a client of the plurality of the clients on a basis of a destination address of the traffic, the destination address comprising the logical IP address of the selected server cluster, selects a destination server in the selected destination server cluster on a basis of a source address of the traffic, the source address comprising an IP address of the client, and replaces the single MAC address of the traffic with a MAC address of the selected destination server.

36. The apparatus of claim 30 wherein:

each router cluster of a plurality of the router clusters has a unique MAC address assigned thereto.

37. The apparatus of claim 30 wherein:

the traffic distributor selects a router from among the plurality of the routers contained within the router cluster for distributing outbound traffic from server to client based on the packet IP destination address.

38. The apparatus of claim 30 wherein:

the traffic distributor selects a router from among the plurality of the routers contained within the router cluster for distributing outbound traffic from server to client so that for any given server-destination connection-flow a same said router is used for every outbound packet so long as the flow remains operational.

39. The apparatus of claim 30 wherein:

the traffic distributor selects a router from among the plurality of routers contained within the router cluster for distributing outbound traffic from server to client so that a probability of any particular router being used for forwarding is the same.

40. The apparatus of claim 30 wherein:

the packet destination IP address is an address of one of the clients which is a destination of the message traffic.

41. The apparatus of claim 30 further comprising:

a definition of at least one server cluster each containing a plurality of the servers, each server cluster being addressed by a different logical Internet protocol (IP) address; and a flow manager that distributes the network traffic from a client of the plurality of the client to a server cluster selected on a basis of a destination address comprising the logical IP address of the selected server cluster and that distributes the network traffic from the client to a selected server in the selected server cluster, the selected server being selected on a basis of a source IP address identifying the client.

42. The apparatus of claim 30 including:

a state machine for distributing the traffic using clustering, the state machine comprising:

an initial state within which elements of a router cluster are assigned a MAC address, the initial state being responsive to an address resolution protocol (ARP) probe;

a bring-up state that is activated on a response to an ARP probe in the initial state; and an active state that is activated upon receipt of consecutive responses of the ARP probe.

43. The apparatus of claim 42 wherein:

the state machine further comprises:

a take-down state that is activated upon a user-specification while in the active state and transitioning to the initial state on a time-out signal.

44. The apparatus of claim 42 wherein:

the bring-up state transitions to the initial state upon lack of response to ARP probes.

45. The apparatus of claim 42 wherein:

the active state transitions to the initial state upon lack of response to ARP probes or a link-down condition.

\* \* \* \* \*